United States Patent [19]

Maurer et al.

[11] Patent Number: 4,579,926

[45] Date of Patent: * Apr. 1, 1986

[54] PROCESS FOR THE FORMATION OF NOVEL ACRYLAMIDE ACRYLATE COPOLYMERS

[75] Inventors: John J. Maurer, New Providence; Donald N. Schulz, Annandale; Jan Bock, Bridgewater, all of N.J.

[73] Assignee: Exxon Research and Engineering Co., Florham Park, N.J.

[ * ] Notice: The portion of the term of this patent subsequent to Jul. 31, 2001 has been disclaimed.

[21] Appl. No.: 598,223

[22] Filed: Apr. 9, 1984

[51] Int. Cl.$^4$ .......................................... C08F 220/56
[52] U.S. Cl. .................. 526/307.5; 210/644; 526/307.7
[58] Field of Search ...................... 526/307.2, 307.5; 210/638, 644, 649

[56] References Cited

U.S. PATENT DOCUMENTS 2,049,828  8/1936  Stevens ............................... 210/644
3,681,269  8/1972  Heitz ................................... 210/644

Primary Examiner—Christopher A. Henderson
Attorney, Agent, or Firm—Richard E. Nanfeldt

[57] ABSTRACT

The present invention relates to a process for the formation of water soluble copolymers of acrylamide and alkyl poly(etheroxy)acrylate which are finished by a dialysis process and are excellent viscosification agents. Wherein the process includes the free radical copolymerization of acrylamide monomer and alkyl poly(etheroxy)acrylate monomer in an aqueous medium under nitrogen conditions in the presence of free radical initiator at a sufficient temperature and for a sufficient time to effect copolymerization.

7 Claims, 2 Drawing Figures

COMPARISON OF SOLUTION PREPARATION
ROUTES FOR AM-co-RPEOAc POLYMERS

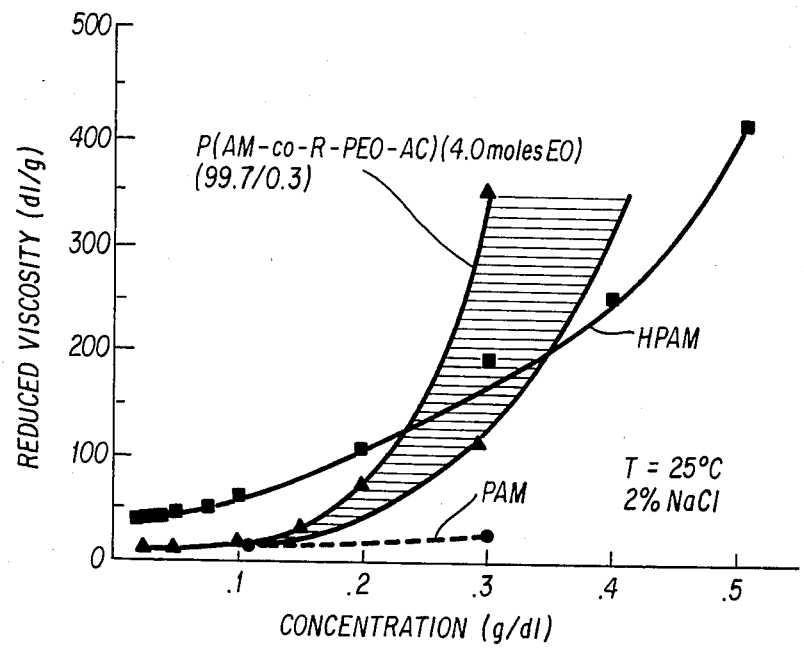
FIG. 1
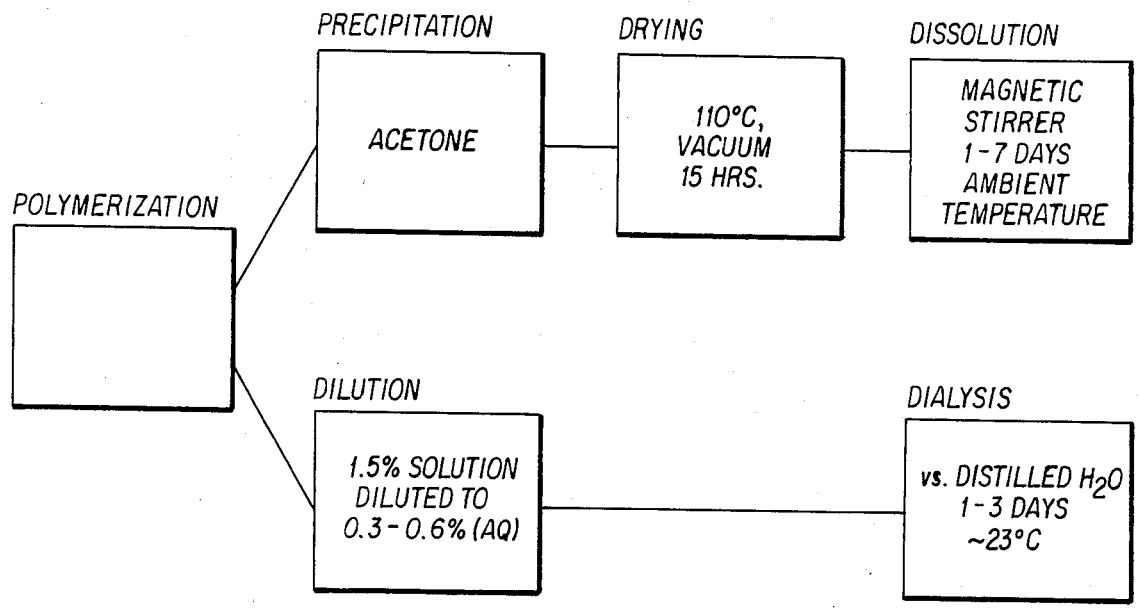
FIG. 2 COMPARISON OF SOLUTION PREPARATION ROUTES FOR AM-co-RPEOAc POLYMERS

PROCESS FOR THE FORMATION OF NOVEL ACRYLAMIDE ACRYLATE COPOLYMERS

BACKGROUND OF THE INVENTION

Polyacrylaminde (PAM) and hydrolyzed polyacrylamide (HPAM) are common water soluble polymers that have found application in oil field chemicals, paints, paper making, cosmetics, etc. The solution rheology of these materials define their use in these applications. With these polymers, aqueous viscosification or thickening is achieved through a combination of high molecular weight and chain expansion due to repulsion of pendent ionic groups along the polymer chain. High molecular weight polymers are difficult to prepare and dissolve and are also sensitive to shear. Viscosification due to charge repulsion is salt sensitive and thus, these polymers have limited utility in highly saline systems.

Polymerizable esters of acrylic acid or methacrylic acid with alkyl or alkylaryl poly(ethyleneoxy)ethyl alcohols are disclosed in Dickstein U.S. Pat. No. 4,075,411.

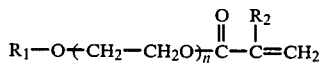

Trecker, U.S. Pat. No. 3,896,161 and British Pat. No. 828,496. Such monomers have found use in the preparation of stable latexes and special textiles.

Copolymers of base-neutralized acrylic acid and nonionic surfactant acrylates have also found use as thickeners for both aqueous solutions and water/organic liquid emulsions (Koenig and Bryant, U.S. Pat. No. 4,268,641). Improved NaCl tolerance is also taught therein. A liquid composition useful as a thickening agent in polymer latexes, comprising a mixture of solvent and a terpolymer of acrylic acid, an ester of the formula of:

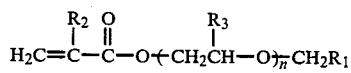

and an alkyl acrylate or methacrylate is claimed in U.S. Pat. No. 4,138,381.

The conventional process for recovering water soluble polymers following polymerization is to precipitate the product via addition of a nonsolvent and then dry the product to remove water. Use of this procedure in the preparation, as disclosed in U.S. Pat. No. 4,463,151, of poly(acrylamide-co-nonylphenoxy(ethylene oxy)acrylate) (AM-co-RPEOAc) systems leads to products which are difficult to dissolve, presumably due to strong bonding in these highly associating copolymers. Solutions prepared from the solid polymer have shown enhanced viscosity vs. non-associating polyacrylamide (PAM). However, there was significant concern regarding the degree of polymer degradation which occurs during the lengthy dissolution period (up to four days). Such degradation would be expected to lead to lower solution viscosity. The instant invention discloses an alternative finishing process which yields polymers having improved solution properties as compared to the polymers made by the process of U.S. Ser. No. 454,285.

PRESENT INVENTION

The present invention discloses a process for the preparation of copolymers of acrylamide and nonionic surfactant monomers which exhibit improved solution properties such as:

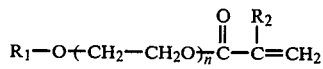

Where $R_1$=alkyl, $C_1$–$C_{20}$; aryl, $C_6$–$C_{30}$; alkylaryl, $C_6$–30; and $R_2$=H or $CH_3$; n=1–60. These surfactant monomers can be referred to as alkyl poly(etheroxy)acrylates or R—PEO—AC.

The compositions of the instant invention, which are prepared by means of a dialysis finishing process, are distinguished from compositions of the same generic polymer made by a precipitation process by their higher solution rheological behavior, e.g., viscosification efficiencies. They are different from hydrolyzed polyacrylamide, a copolymer of acrylic acid and acrylamide, by virtue of their higher thickening ability and concentration dependence of viscosity in a brine environment and often higher retention of viscosity in the presence of inorganic electrolytes. Of course, viscosities of polymer solutions containing inorganic electrolytes are a function of such factors as polymer structure, molecular weight, concentration, amount of alkyl(etheroxy)acrylate, etc.

The present invention is distinct from the acrylic acid salt and nonionic surfactant acrylates of Koenig and Bryant because different comonomers (i.e., acrylamide vs. salts of acrylic acid) and aqueous, rather than hydrocarbon emulsion polymerization methods, are used. Moreover, the instant copolymers are prepared in a one-step process, i.e., neutralization is not required. Acrylic acid-based polymers are to be avoided because of the known susceptibility of acrylic acid (and its salts) to precipitation by polyvalent cations (e.g., $Ca^{++}$); the latter species are often found in geological formations. (F. J. Glaris in "Water Soluble Resins, 2nd Ed", R. L. Davidson and M. Sittig, Eds., Rheinhold, NY, p. 168).

The instant invention describes a novel class of acrylamide copolymers containing alkyl poly(etheroxy)acrylate groups, wherein the copolymers are finished by a dialysis process. These copolymers are water soluble and many exhibit salt insensitive aqueous viscosification. The mechanism of solution viscosity enhancement is different from that found in the prior art systems based on polyacrylamide and hydrolyzed polyacrylamide. In the compositions of the present invention, the presence of a small amount of hydrophobic or water insoluble alkyl group on the surfactant comonomer is believed to result in inter-molecular aggregation or interaction in solution. This aggregation results in enhanced viscosity relative to a noninteracting polymer such as polyacrylamide. Furthermore, the presence of ethylene oxide groups on the surfactant comonomer can be used to adjust polymer solubility and influence viscosity. The relative salt insensitivity of the solution viscosity of these novel copolymers distinguishes them from viscosifiers based on charge repulsion such as hydrolyzed polyacrylamide.

SUMMARY OF THE INVENTION

The present invention relates to unique and novel water soluble copolymers of acrylamide and alkyl poly(etheroxy)acrylate, which are finished by a dialysis process. These polymers are prepared by a free radical copolymerization process, wherein the acrylamide monomer and alkyl poly(etheroxy)acrylate monomer are added to deoxygenated water under a nitrogen purge; the polymerization solution is heated to a temperature sufficient to activate the initiator; free radical initiator is added to the polymerization solution to initiate polymerization; polymerizing the acrylamide monomer and alkyl poly(etheroxy)acrylate monomer for a sufficient time and at a sufficient temperature to form the water soluble copolymer of acrylamide and alkyl poly(etheroxy)acrylate; and recovering the formed water soluble copolymer from the polymerization solution by subjecting the polymerization solution to a dialysis process in order to remove unreacted monomer, polymerization by-products and catalyst from the polymerization solution. Many of these water soluble copolymers of acrylamide and alkyl poly(etheroxy)acrylate are excellent viscosification agents in salt water.

GENERAL DESCRIPTION

The water soluble copolymers of acrylamide and alkyl poly(etheroxy)acrylate of the present invention are formed by a free radical copolymerization process in an aqueous medium and a subsequent dialysis process in which unreacted monomers, initiator fragments and low molecular weight byproducts are removed from the polymerization solution. These water soluble copolymers of acrylamide and alkyl poly(etheroxy)acrylate are useful as viscosifiers in water and in aqueous solutions containing inorganic electrolytes.

The free radical copolymerization process used to form these water soluble copolymers of acrylamide and alkyl poly(etheroxy)acrylate comprises adding acrylamide monomer to deoxygenated water under a nitrogen atmosphere; adding alkyl poly(etheroxy)acrylate monomer to the solution of water and acrylamide monomer to form the polymerization solution; heating the polymerization solution to a sufficient temperature to activate the initiator; adding free radical initiator to the polymerization solution to cause initiation of the copolymerization of the acrylamide monomer and the alkyl poly(etheroxy)acrylate monomer; copolymerizing the acrylamide monomer and alkyl poly(etheroxy)acrylate monomer at a temperature of at least 5° C. for at least 2 hours, more preferably at least 20° C., to form the water soluble copolymer of acrylamide and alkyl poly(etheroxy)acrylate; and subjecting the polymerization solution to a dialysis process in order to remove unreacted monomer, catalyst residues, initiator fragments and low molecular weight byproducts from the polymerization solution.

The water soluble copolymers of acrylamide and alkyl poly(etheroxy)acrylate can be substantially represented by the formula:

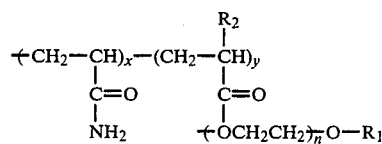

wherein $R_1$ is selected from the group consisting of $C_1$ to $C_{20}$ alkyl groups, $C_6$ to $C_{20}$ aryl groups and $C_6$ to $C_{30}$ alkylaryl groups; $R_2$ is hydrogen or a methyl group, n is about 1 to about 60, more preferably about 5 to about 50, and most preferably about 8 to about 45; y is abut 0.01 to about 5.00 mol.%, more preferably about 0.04 to about 3.0, and most preferably about 0.1 to about 1.5; and x is 95.00 to about 99.96 mole %, more preferably about 97.0 to about 99.06 and most preferably about 99.9 to about 98.5. Typical, but nonlimiting examples of preferred R groups are methyl, octadecyl, phenyl and nonylphenyl.

The intrinsic viscosity of the water soluble copolymers of acrylamide and alkyl poly(etheroxy)acrylate is about 1 to about 25, more preferably about 2 to about 20, and most preferably about 3 to about 10. The intrinsic viscosity, $[\eta]$, is related to the viscosity average molecular weight, $\overline{M}v$, by the Mark Houwink relationship: $[\eta] = K\overline{M}_v{}^\alpha$.

Suitable alkyl poly(etheroxy)acrylate monomers useful in the preparation of the water soluble copolymers of the instant invention are methyl, dodecyl, octadecyl phenyl, octylphenyl, and nonylphenyl.

Suitable free radical initiators for the instant free radical copolymerization process include potassium persulfate, 2,2'-azobisisobutyronitrile (AIBN), $H_2O_2$, and ethanolamine/sodium sulfite. The concentration of the free radical initiator is about 0.01 to about 1.0 grams per 100 grams of the acrylamide monomer and alkyl poly(etheroxy)acrylate monomer.

The concentration of the acrylamide monomer and alkyl poly(etheroxy)monomers in the aqueous polymerization solution is about 1 to about 20 grams of acrylamide monomer and alkyl poly(etheroxy)monomer per 100 grams of water, more preferably about 3 to about 15, and most preferably about 3 to about 10. Copolymerization of the acrylamide monomer and alkyl poly(etheroxy)acrylate monomer is effected at a temperature of about 5° to about 80° C., more preferably about 20° to about 60°, and most preferably about 40° to about 60° for a period of time of about 0.5 to about 48 hours, more preferably about 2 to about 30, and most preferably about 4 to about 24.

Copolymers of acrylamide and alkyl poly(etheroxy)acrylate are recovered from the polymerization solution by a dialysis process. The reaction mixture, typically containing about 3.0 wt. % polymer, was first diluted 1:1 with doubly distilled water. The Brookfield viscosity (12 rpm) of this solution (~1.5% polymer) was then determined to provide an initial evaluation of synthesis and polymer quality. This 1.5 wt. % solution was then diluted (to 0.3-0.6% polymer) with doubly distilled water and dialyzed for two to three days to remove unreacted monomer, catalyst residues, polymerization byproducts, etc. Dialysis was conducted in a Spectrapor membrane (#2, MW cut-off=12,000–14,000) which was previously conditioned by boiling for one hour in 2% $NaHCO_3$ solution. In a typical dialysis run, about 500 ml of the reaction mixture was placed in about three feet of conditioned dialysis membrane. Plastic clamps from Spectrum Medical Industries were used to seal the ends of the membrane. The membrane was placed in about four liters of doubly distilled water contained in a four liter breaker. A magnetic stirrer was used to provide mixing of the system. After each dialysis period (one to two days), the conductivity of the water on the outside of the membrane was measured via a Model 31 Conductivity Bridge (YSI). The dialysis was considered complete when the conductivity of the water on the outside of the membrane reached the value of pure distilled water. If the conductivity was higher than this value, the membrane containing the polymer solution was placed in fresh doubly distilled water and the process repeated until the desired conductivity was reached. A dialysis time of two to three days was usually sufficient to reach the desired conductivity.

The dialyzed solutions of some polymers were gel-like, had very high viscosities and were difficult to handle when diluting to the desired concentrations for viscometrics analysis. For such systems, the reaction mixtures were initially diluted to about 0.2-0.3% with doubly distilled water prior to dialysis.

BRIEF DESCRIPTION OF THE DRAWINGS

FIG. 1 illustrates a plot of reduced viscosity versus concentration for an acrylamide polymer, a hydrolyzed acrylamide polymer and a copolymer of acrylamide and alkyl poly(etheroxy)acrylate.

EXAMPLE 1

Copolymerization of Actylamide with Alkyl Poly(etheroxy)acrylates R—PEO—AC)

A 500-1000 ml quantity of distilled water was added to a resin flask equipped with a water condenser, thermometer, mechanical stirrer, as well as a nitrogen inlet and outlet. Nitrogen was bubbled through the solution for 15-30 minutes. The acrylamide (AM), Aldrich, monomer (0.32-42 mol) and alkyl poly(etheroxy)acrylate (R—PEO—AC) monomers (0.42-8.5×$10^{-3}$ mol) were charged to the flask. The alkyl poly(etheroxy)acrylate monomers used were commerical products of the Monomer-Polymer and Dajac Laboratories, e.g., 8615, 8618, 8617 and were used as received. The solution was heated by an oil bath under nitrogen purge at 50° C. for 1 hour. After this period of time, the $K_2S_2O_8$ initiator (0.005-0.1 g) was added and the temperature maintained at 50°-55° C. under nitrogen for about 18.5-24 hours (Conversion 70-95%). Polymers were purified by precipitation or dialysis techniques. Polymers prepared by the precipitation technique were driven by vacuum or freeze drying. Table I describes copolymers prepared according to this Example. The surfactant acrylate content is indicated as mole % of monomer charge.

EXAMPLE 2

Copolymerization of Acrylamide with Alkyl Poly(etheroxy)acrylates (R—PEO—Ac)

Involving Product Recovery via Dialysis (9595-72)

To a 2 liter reaction kettle with an air driven stirrer motor, glass stir rod, teflon blade, glass thermometer, water condenser and $N_2$ inlet tube, was added 1 Kg of distilled $H_2O$, heated at 50°-55° C. for 1 hour under nitrogen purge. Then 30.0 g (0.42 moles) of acrylamide and 0.9 g (1.25×$10^{-3}$ moles) of R—PEO—$_{10}$Ac (8615) was added, where R=nonylphenyl, as well as 0.005 g (1.85×$10^{-5}$ moles) of $K_2S_2O_8$ in 5 ml of $H_2O$ were added. Polymerization time was 18 hours. Table I describes copolymerization (9595-72) according to this Example. The surfactant acrylate content is indicated as mole % of monomer charge.

The polymerization solution (3.1%) polymer was initially diluted 1:1 with doubly distilled water to reduce the viscosity and improve handling characteristics. This 1.5% solution was then diluted to 0.42% via further addition of doubly distilled water. The 0.42% solution was then dialyzed for four days to remove unreacted monomer, catalyst residues, polymerization byproducts, etc. Dialysis was conducted in a Spectrapor membrane (#2, MW cut-off=12,000-14,000) which was previously conditioned by boiling for one hour in 2% $NaHCO_3$ solution. About 500 ml of the reaction mixture was placed in about three feet of conditioned dialysis membrane. Plastic clamps from Spectrum Medical Industries were used to seal the ends of the membrane. The membrane was placed in about four liters of doubly distilled water contained in a four liter beaker. A magnetic stirrer was used to provide mixing of the system. After each dialysis period (one to two days), the conductivity of the water on the outside of the membrane was measured via a Model 31 Conductivity Bridge (YSI). The dialysis was considered complete when the conductivity of the water on the outside of the membrane reached the value of pure distilled water. If the conductivity was higher than this value, the membrane containing the polymer solution was placed in fresh doubly distilled water and the process repeated until the desired conductivity was reached.

The concentration after dialysis was 0.38% polymer. This dialyzed solution was diluted to 0.30% polymer via the addition of doubly distilled water following which two percent sodium chloride was added. The viscosity of this solution (8861-149), measured as described in Table I, was 1220 cp.

There are several advantages for the use of a dialysis process for recovering certain of these polymers from polymerization solutions. First, as shown by the comparison in FIG. 2 the dialysis process is faster than the precipitation process; second, the lengthy mixing period generally required to achieve complete dissolution of solid polymer is undesirable since it can lead to extensive shear degradation of the *dissolved* polymer molecules. To evaluate the effect of long term mixing of these solutions, a filtered solution of 9595-66P (initial viscosity of 731 cp after a 4 day dissolution period) was allowed to continue mixing for an *additional* 4 days via the conditions used to dissolve the original solid polymers. The viscosity of the 0.3% 9595-66P solution (measured according to the procedure given in Table I) decreased to 190 cp after one day, 95 cp after two days, to 35 cp after three days and to 15 cp after four days. Third, the use of a dialysis procedure generally leads to substantially higher solution viscosity as shown in Tables I and II. This is believed to be due in part to absence of the shear degradation effects encountered in the solid polymer dissolution process.

EXAMPLE 3

Copolymerization of Acrylamide with Alkyl Poly(etheroxy)acrylates (R—PEO—Ac)

Involving Product Recovery via Precipitation

Part of the polymer prepared in Example 2 was recovered via a precipitation process. The polymerization solution (3.0% polymer) was first diluted to 1.5% polymer via addition of doubly distilled water. The 1.5% polymer solution was then added gradually at room temperature to rapidly stirred acetone (1 liter/per 500 ml of polymer solution in a 1 liter beaker. The coagulated polymer was subsequently washed with fresh acetone. The polymer was manually broken into small pieces and dried overnight at 25° C. in a vacuum oven.

Dry solid polymer (9595-72P) was weighed (0.30 g) into a 250 ml Erlenmeyer flask and solvent (doubly distilled water containing two percent sodium chloride) was weighed into the same flask. The polymer was then allowed to agitate on a magnetic stirrer until complete dissolution was achieved. The polymer dissolved very slowly and complete dissolution required a mixing period of seven days. A portion of the polymer solution was subjected to filtration through a 150 mesh stainless steel screen to remove any microgel particles. An aliquot of the filtered solution was vacuum dried at 110° C. to determine polymer concentration. The viscosities of the original and filtered solutions (0.30 wt. %) of 9595-72P, measured according to the procedures given in Table I and 9973-75-1, were 29 cp and 25 cp, respectively.

TABLE I

COMPARISON OF AM-co-RPEOAc VISCOMETRICS VIA DIALYSIS OF FINAL REACTION MIXTURES VS. DISSOLUTION OF SOLID POLYMER

| | Synthesis Conditions | | | Initial Solution Viscosity; Contraves, 1.28 sec$^{-1}$, 25° C. (0.3% polymer in 2% NaCl) | | | | |
|---|---|---|---|---|---|---|---|---|
| | | | | Dialyzed Solution | | Solution prepared from Solid Polymer | | |
| Notebook 9595- | Polymer Charge (%) | $\frac{M}{I^{\frac{1}{2}}}$ | RPEOAc (0.3 mol %) | Viscosity$^{(1)}$ | Notebook 8661 | Unfiltered | Filtered | Notebook 9595 |
| 66 | 3 | 60 | 8617 | 2794 | 142 | 1145 | 731 | 66P$^{(2)}$ |
| 71 | 3 | 30 | 8617 | 305 | 148 | 35 | 33 | 71P |
| 72 | 3 | 97.6 | 8615 | 1220 | 149 | 29 | 25 | 72P |
| 73 | 3 | 97.6 | 8616 | 2794 | 150 | 193 | 188 | 73P |
| 78 | 3 | 97.6 | 8617 | 946 | 153 | | | 78P |

$^{(1)}$Contraves, 1.28 sec$^{-1}$, 25° C.
$^{(2)}$The letter P indicates solid polymer was recovered from the polymerization solution via acetone precipitation and subsequent vacuum drying of the precipitated polymer.

TABLE II

PREPARATION OF SOLUTIONS BY DIALYSIS REVEALED IMPROVED AMcoRPEOAc VISCOMETRICS

| | Viscosity (cP; 20° C.; 0.3% polymer/2% NaCl) (0.3 mole % Comonomer) | | | | | |
|---|---|---|---|---|---|---|
| | $\frac{M}{I^{\frac{1}{2}}} = 30$ | | $\frac{M}{I^{\frac{1}{2}}} = 60$ | | $\frac{M}{I^{\frac{1}{2}}} = 98$ | |
| Comonomer | Precipitated | Dialyzed | Precipitated | Dialyzed | Precipitated | Dialyzed |
| 8615 | 9 | 11 | 11 | 27 | 18 | 1200 |
| 8616 | 155 | 145 | 71 | 246 | 177 | 2800 |
| 8617 | 33 | 305 | 731 | 2800 | — | 946 |

*Dialysis viscometrics much better than solid polymer route.
*The dialysis approach enabled meaningful evaluations of the effect of synthesis variables and polymer composition on viscometrics.

What is claimed is:

1. A free radical copolymerization process for the formation of a copolymer of acrylamide/alky poly(etheroxy)acrylate which comprises the steps of:
   (a) forming an aqueous polymerization solution from acrylamide monomer, deoxygenated water under a nitrogen atmosphere and alkyl poly(etheroxy)acrylate;
   (b) heating said polymerization solution to at least 50° C.;
   (c) adding sufficient free radical initiator to said polymerization solution to initiate copolymerization of said acrylamide monomer and said alkyl poly(etheroxy)acrylate monomer;
   (d) polymerizing said acrylamide monomer and said alkyl poly(etheroxy)acrylate monomer in said polymerization solution for a sufficient period of time, at a sufficient temperature to form said copolymer, and
   (e) subjecting said polymerization solution to a dialysis process to remove unreacted monomer, low molecular weight byproducts and catalyst residues from said polymerization solution, said dialysis process comprising passing said polymerization solution thrugh a Spectrapor membrane (#2, molecular weight cut-off=12,000-14,000).

2. A free radical process according to claim 1 wherein said copolymer is water soluble.

3. A free radical process according to claim 2 wherein said copolymer has substantially the formula:

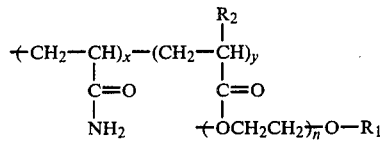

wherein $R^1$ is selected from the group consisting of $C_1$ to $C_{20}$ alkyl groups, $C_6$ to $C_{20}$ aryl groups and $C_6$ to $C_{30}$ alkylaryl groups, $R_2$ is hydrogen or methyl group, n is about 23 to 60, y is about 0.01 to about 5.00 mole %, and x is about 95.00 to about 99.99 mole %.

4. A free radical copolymerization process according to claim 1 wherein said $R_1$ is an alkyl group having about 1 to about 20 carbon atoms.

5. A free radical copolymerization process according to claim 4 wherein n is about 1 to about 60 mole %, y is about 0.04 to about 3.0 mole % and x is about 97.0 to about 99.0 mole %.

6. A free radical copolymerization process according to claim 1 wherein said reaction solution is maintained at a temperature of at least about 40° C. for at least about 5 hours.

7. A free radical copolymerization process according to claim 1 wherein said free radical initiator is selected from the group consisting of AIBN, $H_2O_2$, $H_2O_2$/Fe, $H_2O_2$/Ce (IV), and potassium persulfate.

* * * * *